Feb. 10, 1931.  F. L. SESSIONS  1,791,978
DYNAMO ELECTRIC MACHINE
Filed Dec. 1, 1926  4 Sheets-Sheet 1

INVENTOR:
Frank L. Sessions

Feb. 10, 1931.   F. L. SESSIONS   1,791,978
DYNAMO ELECTRIC MACHINE
Filed Dec. 1, 1926    4 Sheets-Sheet 2

INVENTOR:
Frank L. Sessions

Feb. 10, 1931.  F. L. SESSIONS  1,791,978
DYNAMO ELECTRIC MACHINE
Filed Dec. 1, 1926  4 Sheets-Sheet 3
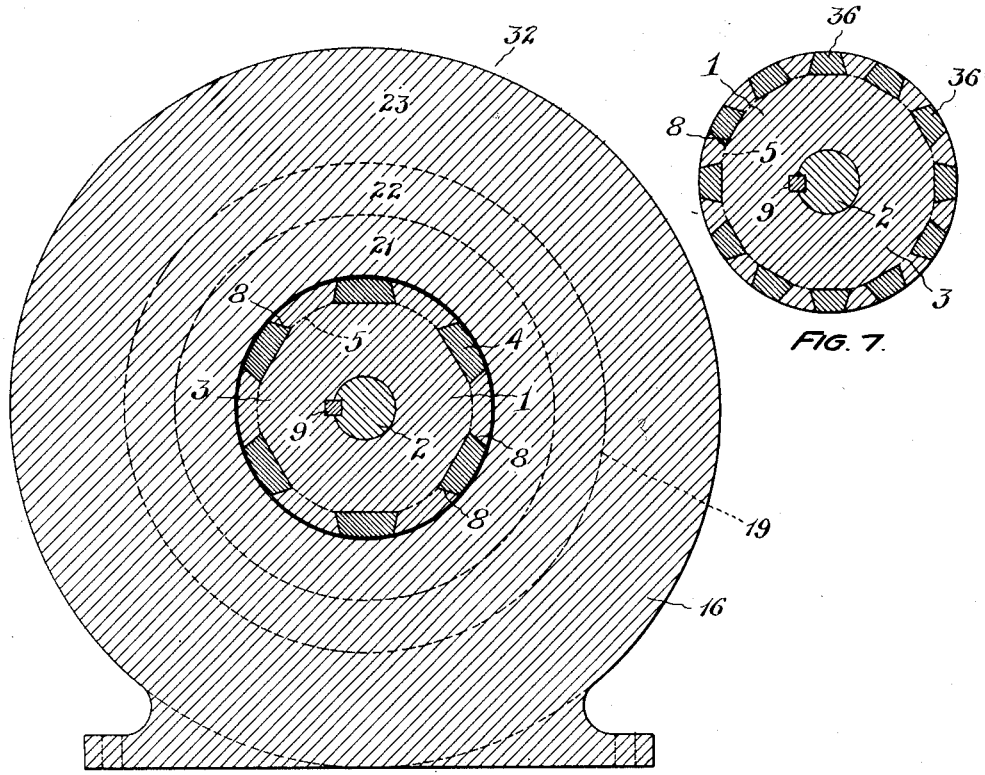
FIG. 5.
FIG. 7.
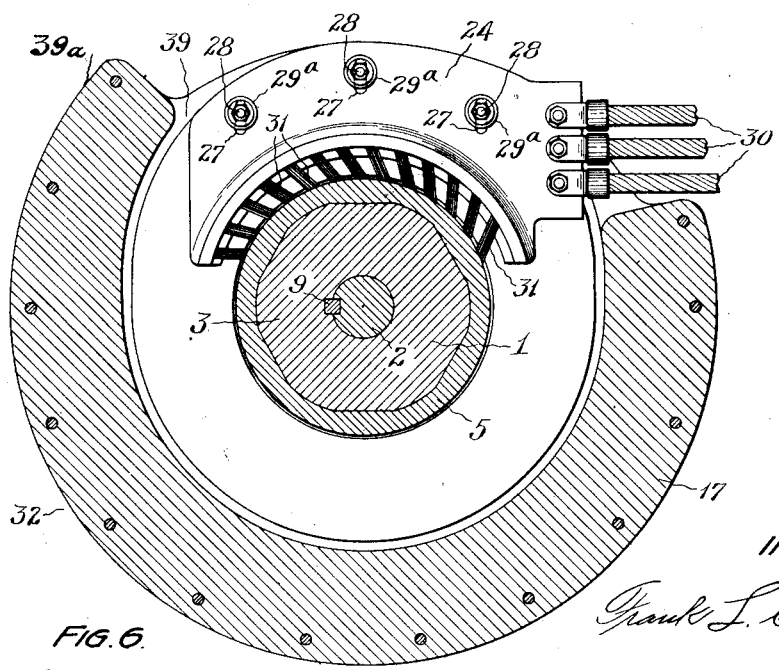
FIG. 6.
INVENTOR:
Frank L. Sessions Feb. 10, 1931.  F. L. SESSIONS  1,791,978

DYNAMO ELECTRIC MACHINE

Filed Dec. 1, 1926  4 Sheets-Sheet 4

INVENTOR:
Frank L. Sessions

Patented Feb. 10, 1931

1,791,978

UNITED STATES PATENT OFFICE

FRANK L. SESSIONS, OF LAKEWOOD, OHIO

DYNAMO-ELECTRIC MACHINE

Application filed December 1, 1926. Serial No. 152,035.

My invention relates to that class of dynamo electric machines known as homopolar or unipolar machines that may be used either as generators or motors but which, due to their inherent low voltage and large current characteristics, are seldom used as motors.

I am aware that heretofore various forms of homopolar or unipolar dynamos have been proposed and am familiar with the design and construction of such machines. The inexorable natural laws governing electromagnetic current induction and transmission; the limitations of speed of mechanical rotation of the inductor or inductors; the necessity of employing inductors of very large cross section to efficiently carry the low voltage current; the necessity of employing sliding contacts for conducting the current to and from the inductors; and the difficulties of avoiding excessive mechanical and electrical heating of the various parts of the machines have so restricted their development and usage that they are practically unknown in industry. Most of the machines of this type in existence today are to be found in the experimental laboratories of educational institutions, and such limited use as is made of them is for the most part if not wholly experimental.

One of the factors that has militated against the construction and operation of these machines has been the introduction of very large air gaps in the magnetic circuits of the magnetic fields, especially between the rotors and stators, made necessary to provide space for the inductors and proper mechanical clearances between the rotating and stationary parts. It is known to those skilled in the art that such large air gaps require correspondingly large magneto-motive-forces to send the requisite number of magnetic lines of force across them and that this calls for large field coils and large areas of field pole and rotor faces the provision of which results in large, heavy and costly construction. Extremely high speed of inductors has been resorted to for offsetting some of the effects of large air gaps but only to encounter other difficulties in providing safe mechanical strength of rotating parts and avoiding excessive brush and other friction losses and heating.

Among the objects of my invention are the provision of a uni-directional continuous current or homopolar dynamo electric machine, having a rotor with a smooth cylindrical surface, and a connected system of inductor bars and collector rings inter-locked with the mass of the rotor, with the collector rings at the ends of the inductors, the parts constituting electrical and magnetic circuits of the rotor being mechanically interlocked in a strong rigid structure; the rotor being provided with cylindrical magnetic polar surfaces at the end portions of the cylinders; a stator comprising a magnetic field having a continuous cylindrical surface concentric with the rotor and surrounding the inductor bar portion thereof, with the return magnetic circuit having cylindrical surfaces concentric with and surrounding the cylindrical magnetic polar surfaces on the end portions of the rotor; and a small air gap between the concentric cylindrical rotor and stator.

A further object is to provide a rotor for a homopolar dynamo that constitutes a substantially solid mass of metal, and that may be rotated at high speeds without risk of the inductor bars being thrown out by centrifugal force.

A further object is to provide a rotor for a homopolar dynamo consisting of a substantially solid mass of metal comprising electrical and magnetic circuits, that will be practically free from injury in shipment, and that will not suffer damage by rough or careless handling.

Further objects of the invention will be apparent to those skilled in the art upon reading the specification.

A preferred embodiment of my invention is described in this specification and shown in the accompanying drawings in which:

Fig. 5 is a vertical section on line V—V of Fig. 1;

Fig. 6 is a vertical section on line VI—VI of Fig. 1, showing the collector brushes;

Fig. 7 is a transverse section through a modified form of rotor;

Figures 1, 2:
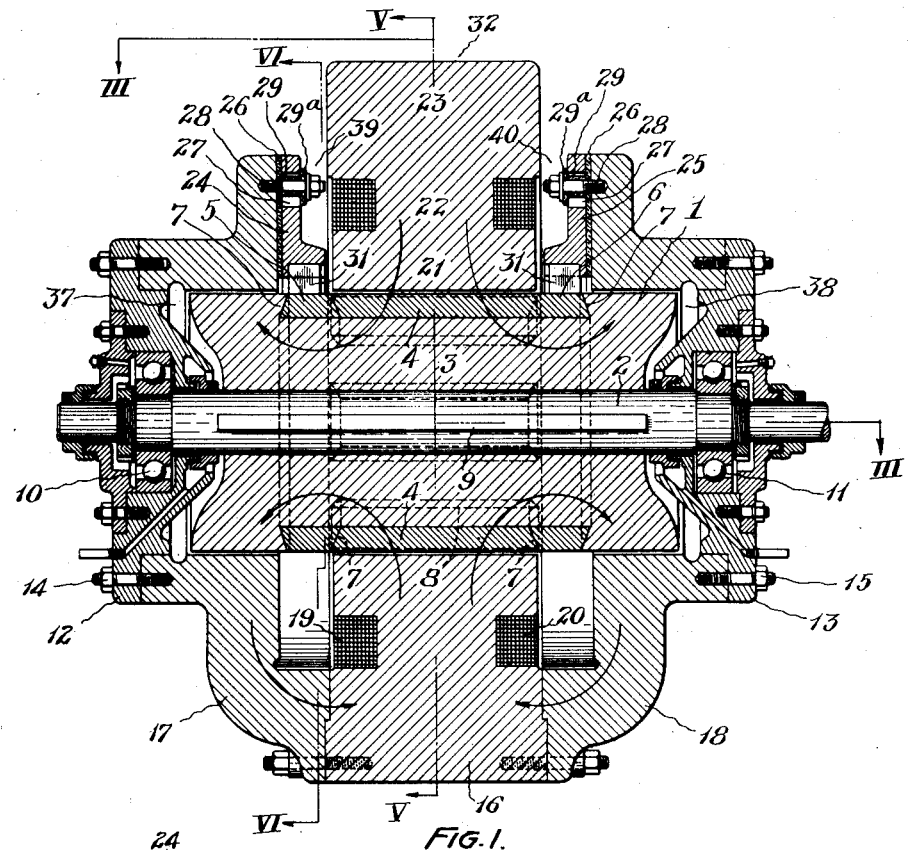
Fig. 1 is a vertical longitudinal section on the axis of a dynamo electric machine embodying my invention.
Fig. 2 is a side elevation of the machine shown in Fig. 1 direct coupled to a driving motor.
Figure 3:
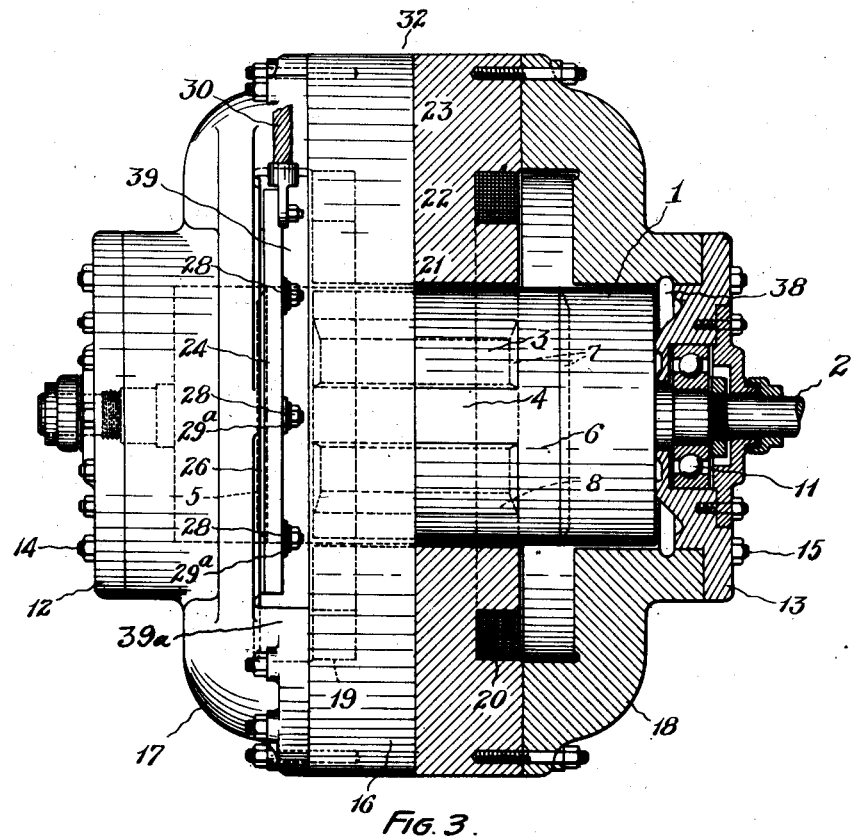
Fig. 3 is a plan view partly in section on line III—III of Fig. 1.

Referring to the drawings, 1 is a rotor constructed in accordance with my invention comprising a revoluble shaft 2; a core 3 of magnetizable material such as a steel casting secured to shaft 2 for rotation therewith; an inductor or inductors 4 preferably disposed in a longitudinal aperture or apertures in the periphery of the core 3; and collector rings 5, 6 connected to the opposite ends of the inductor and preferably disposed in apertures in the periphery of the core 3.

In constructing the rotor, I prefer to first make the steel core with apertures in it suitable for the reception of the inductors and collector rings and to cast the copper or other suitable electric conductor metal into the apertures, employing the apertured steel core surrounded by sand or other suitable material as the casting mould. After casting, the inductors and collector rings may be hammered to harden them and to make them tightly fit the apertures if desired. I prefer to make the apertures with overhanging or dovetailed sides as shown at 7, 8 to assist in sustaining the electrical conductor elements 4, 5, 6 against the centrifugal force of rotation, and to reduce the reluctance of the air gap between the rotor and stator faces by providing wide faces on the rotor core teeth. It will be apparent to those skilled in the art that the cross sections of the inductors and collector rings may differ in shape and proportions from those shown in the drawings. Likewise the number, size and circumferential spacing of the inductors may be made such as may be found necessary or desirable. The inductors preferably should be spaced symmetrically around the rotor and be made of ample mechanical strength and electric current carrying capacity.

After the inductors and collecting rings have been cast or otherwise mounted in the steel core, they may be accurately machined as though they were all one casting and the shaft 2 may be secured in the bore of the core 3 by suitable known means, such as the key 9. The completed rotor should be dynamically balanced and for this reason I prefer to machine the slots or apertures for the inductor and collecting ring members before casting or otherwise securing them in place.

The assembled core, inductors and collector rings are preferably machined to the same diameter throughout the length of the rotor to facilitate machining and assembling of the rotor and stator, but it is obvious that the collector rings may be made of larger diameter than the steel core to provide for wear.

The shaft 2 is preferably revolubly supported by ball bearings 10, 11 but it will be understood that any suitable bearings may be employed. The bearings may be mounted in bearing housings 12, 13, respectively, and these bearings housings preferably are made with portions fitting bored apertures in the stator field frame of such diameter as to permit the rotor to pass through them to facilitate assembling. The bearing housings may be bolted as shown at 14, 15 or otherwise suitably secured to the stator field frame.

The stator comprises the field frame which is preferably made in three principal parts, a middle part 16; two end parts 17, 18; and field coils 19, 20. It will be understood that the current collecting devices and the external-circuit connecting terminals may be mounted upon the stator and to this extent they may be classed as parts of the stator. The middle part 16 of the field frame is preferably a steel casting having an annular core or pole 21 surrounding that portion of the rotor that contains the inductors and a radially extending core portion 22, in the form of a web or spokes if desired, that connects the pole 21 with the annular yoke portion 23.

While I have shown the central portion of the stator which embodies the pole face 21, web 22 and ring 23 made of a single integral piece, it will be understood that it may be made of two or more pieces suitably secured together, such for instance as two semi-cylindrical parts like the halves of multipolar dynamo field frames of well-known construction.

The middle part 16 and the end parts 17 and 18 are accurately bored, preferably to the same diameter, the surface of the bore of the middle part forming the active and the surfaces of the bores of the end parts forming inactive pole faces that are presented to the surface of the rotor. This construction permits the air gap between the rotor and stator being made only large enough for proper running clearance. It will be understood that electromotive forces will be generated in those portions of the rotor that are opposite the inactive poles, but that such electromotive forces will be opposed by equal and opposite electromotive forces and that current will not flow under such conditions.

The brush holders 24 and 25 are preferably adjustably supported upon the stator as shown in Figs. 1 and 6. Suitable insulation 26 should be interposed between the brush holders and the metal of the stator. I prefer to provide slots 27 in the brush holder and to employ bolts or studs with nuts such as those shown at 28 for frictionally holding the brush holder in place. It will be understood that the bolts should be completely insulated from the brush holder as by means of insulating bushings 29 and washers 29a, which are shown in the drawings.

The brushes 31 are preferably of the laminated copper type. They may be mounted in the brush holders in any suitable way, but I prefer to insert them in slots milled in the brush holder at suitable angles to give the brushes a flexible spring yielding contact upon the collector rings.

It will be apparent to those skilled in the art that the number and size of brushes to be employed may be made suitable for the current capacity of the machine. If desired the entire circumference of the collector ring may be surrounded by brushes.

Current may be conducted from the brush holders by any suitable means. In the drawings I have shown conductor cables 30 detachably connected to the brush holders for this purpose. The slots 27 permit the brush holders to be adjusted toward and from the collector rings to vary the pressure of the brushes thereon as will be understood.

In Fig. 2 the homopolar generator 32 is shown coupled direct to a driving motor 33 by a known type of coupling 34. The machines are mounted upon a common base 35. It will be understood that any known form of mechanical driving means may be employed for transmitting power to or from machines built in accordance with my invention.

Figure 4:
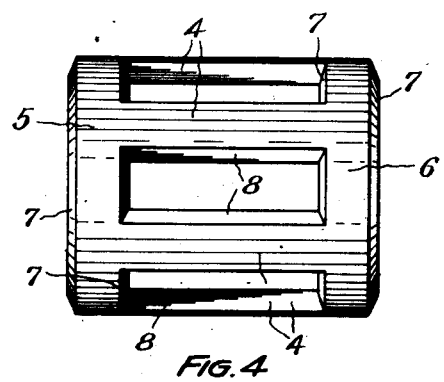
Fig. 4 is a side elevation of the inductor and collector rings as they would appear if separated from the rotor core.

In Fig. 4 there is shown a detailed drawing of the inductor and collector rings made up of the inductor bars 4 and collector rings 5 and 6 as they would appear if separated from the rotor 3. The beveled or dovetailed sides and ends 7 and 8 are indicated in this figure.

In Fig. 7 there is shown a transverse section of a rotor having an inductor made up of a greater number of smaller bars 36 than is shown in other figures of the drawing. It will be understood that while I have shown and described the inductor bars and collector rings as being cast integrally in place upon the core of the rotor, they may be made in any other known way, such for instance as by using separate rings and bars joined together by soldering, welding or other means. It will also be understood that the core 3 may be made in more than one piece to facilitate manufacture or assembling if desired.

As homopolar generators are best adapted to develop large currents of low voltage the field coils 19 and 20 are preferably separately excited from another source of current, but it will be understoood that if desired, these coils may be suitably wound to make the machine self-exciting and that the fields may be compound wound in known manner. The operation of my invention is as follows:

Assuming the magnetic field to flow in the direction of the arrows shown in Fig. 1 and the rotor with its inductors to be rotated, electromotive forces will be induced in the portion of the inductor that lies between the collector rings to cause current to flow to the right or left as seen in Fig. 1, depending upon the direction of the rotation of the rotor. If the external circuit from the brushes be closed current will flow through it. Electromotive forces will also be generated in the magnetizable core of the rotor adjacent to the inductors, but such of these as are of the same potential and direction as the E. M. F. generated in the active portion of the inductors will also cause current to flow through the external circuit of the machine. If desired, however, the inductors and collector rings may be completely insulated from the core of the rotor.

Clearance spaces 37 and 38 may be provided at the ends of the rotor to reduce any unbalancing of the longitudinal magnetic pull upon the rotor from any cause and prevent undue end thrust upon the rotor shaft bearings.

Suitable openings such as those shown at 39, 40 may be provided for the reception of the brush holders and external connections and for access thereto. These openings may be made of suitable size and shape and number and should preferably be arranged so as to not cause an unsymmetrical distribution of magnetic flux between stator and rotor. In Figs. 2 and 5 the thick yokes, 39a, 40a, are shown extended close to the brush holder openings 39, 40, to prevent unbalanced distribution of the magnetic flux.

Figure 8:
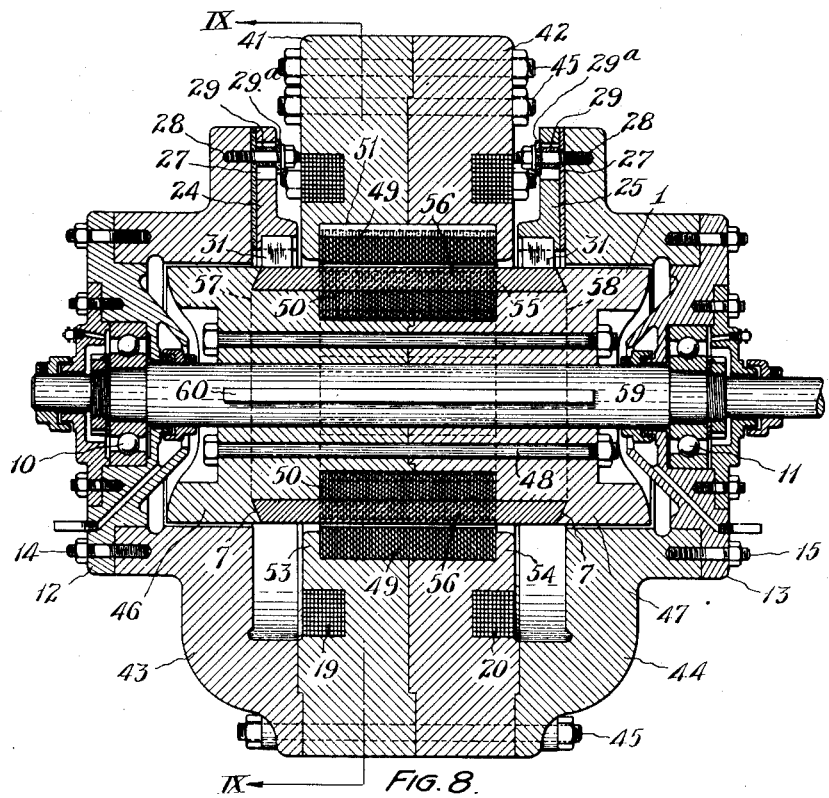
Fig. 8 is a longitudinal section through a machine having its active pole faces laminated.
Figure 9:
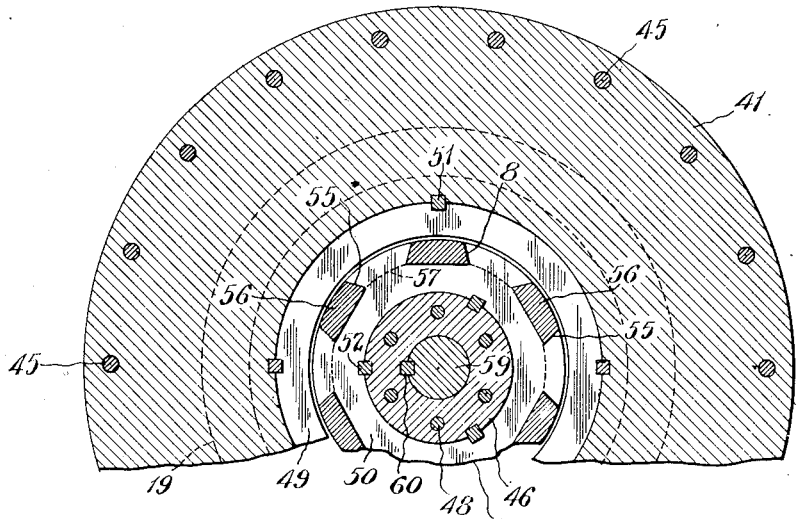
Fig. 9 is a fragmentary transverse section on line IX—IX of Fig. 8.

Figures 8 and 9 are respectively a longitudinal and a fragmentary transverse section through modifications of the constructions of the stator and rotor to provide for the use of laminated pole faces. In this construction the center portion of the stator field frame is made in two parts 41, 42 and the end parts or yokes 43, 44 are bolted through and through with the parts 41, 42 by bolts 45. The rotor body is also made in two parts 46, 47 bolted together by means of bolts 48. Cylindrical recesses may be provided in the non-laminated opposed faces of the central member of the stator composed of parts 41, 42 and the rotor composed of parts 46, 47, for the reception of laminations 49 and 50, which are preferably made of discs of iron or steel of high magnetic permeability. Suitable means, such as keys 51, 52 may be employed to secure the laminations against circumferential displacement. The central stator members 41, 42 may be provided with clamping flanges 53, 54 for clamping the stator laminations 49. Registering slots 55 may be provided in the laminations to form apertures for the reception of the inductor bars of the rotor. The inductor bars 56 and the collector rings 57, 58 may be cast or otherwise inserted and secured in the assembled rotor core after the core is assembled and the completed rotor may be mounted upon its shaft 59 and keyed thereto by means of key 60 in well-known manner. Any convenient number of keys 51, 52 may be employed. It is preferable to use more than one key in order to radially support the laminations that may lie in the plane of the joints between the members 41 and 42 or 46 and 47.

Laminations if used will tend to reduce hysteresis and eddy current losses in the active pole faces.

While my invention may be used for developing continuous current at low voltage for any purpose, it is especially advantageous for electrical resistance welding, particularly the progressive welding of longitudinal seams in tubes, plates, etc.; for electroplating; and for electrolytic operations where large volumes of direct current are required.

I claim:

1. In a dynamo electric machine a rotor composed of a core of magnetizable material having integral magnetic polar end portions and having longitudinal slots and circumferential slots in its periphery, the longitudinal slots opening into the circumferential slots, and inter-locked cast unitary inductor bars and collector rings respectively disposed in said longitudinal and circumferential slots.

2. A homopolar dynamo electric machine comprising a stator and a rotor, the stator having an active pole face and an inactive pole face longitudinally separated from each other, the rotor having a longitudinal peripheral slot with an inductor therein and a circumferential slot at one end of said inductor between the active and inactive pole faces, a collector ring in said circumferential slot electrically connected to said inductor, a second collector ring disposed at the other end of said inductor and electrically connected thereto, a field magnet yoke connecting said active and inactive pole faces said rotor extending across said pole faces and the space between them, means for magnetizing said stator and means for conducting electric current to and from said collector rings.

3. In a homopolar dynamo electric machine a rotor having a magnetizable core with integral magnetic polar end portions, and having longitudinal and circumferential slots in its periphery, a cast unitary inductor and collector ring system comprising inductor bars in said longitudinal slots and collector rings in said circumferential slots, said inductor bars and collector rings having their outer surfaces substantially flush with the cylindrical periphery of said core.

4. In a homopolar dynamo electric machine a rotor having a core of magnetizable material, a stator having axially spaced-apart cylindrical pole faces surrounding the periphery of the rotor with air gaps between the opposed adjacent portions of the rotor and stator faces, inductors disposed in apertures extending longitudinally across one of said stator pole faces in the periphery of the rotor, collector rings connected to the ends of said inductors, and current collecting brushes contacting with said collector rings.

5. In a homopolar dynamo electric machine, a stator comprising a magnet field frame having an active pole and two inactive poles, one at either end of the active pole spaced-apart therefrom and bored in alignment therewith, field energizing coils co-axial with the bore of said poles disposed between said active and inactive poles, magnet yokes connecting said active and inactive poles, a rotor supported in bearings for free rotation in the bore of said poles, said rotor comprising a core of magnetizable material, axially of substantially the same overall length as said stator, said rotor having longitudinal apertures in its periphery opposite to and substantially of the same length as the face of said active pole, a circumferential aperture in said core at either end of said longitudinal slots and intermediate the faces of said active and inactive poles, inductors in said longitudinal apertures and collector rings in said circumferential apertures said inductors and collector rings being electrically connected together and brushes supported in contact with said collector rings.

6. In a homopolar dynamo electric machine a rotor having a core of magnetizable material, a stator having axially spaced-apart pole faces adjacent and parallel to the rotor with air gaps between the opposed rotor and stator faces, an inductor disposed in an aperture in the rotor face and extending across one of said stator pole faces, collector rings connected to the ends of said inductor, and current collecting brushes contacting with said collector rings.

7. In a dynamo electric machine a core composed of magnetizable material having integral magnetic polar end portions and having longitudinal slots and circumferential slots in its periphery, the longitudinal slots opening into the circumferential slots, said longitudinal slots being wider at their bottoms than at their tops, a cast unitary inductor and collector ring system comprising inductor bars fitting in said longitudinal slots and collector rings disposed in said circumferential slots.

8. In a homopolar dynamo electric machine, a cylindrical rotor including a core of magnetizable material, said core having a non-laminated central portion, and an annular laminated peripheral portion slotted to receive inductor bars, said laminated portion being composed of separate discs of magnetizable material and means securing said discs against circumferential displacement on said central portion.

9. In a homopolar dynamo electric machine a stator having a non-laminated cylindrical body portion and a laminated pole face composed of annular laminations of magnetizable material and means securing said pole face against circumferential and axial displacement on said stator, annular recesses in said cylindrical body portion, and exciting coils in said annular recesses.

10. In a homopolar dynamo, a rotor having an inductor system thereon, said inductor system comprising an integral network of cast inductor bars and collector rings, and magnetic polar ends on said rotor.

11. A rotor for homopolar dynamos having a smooth cylindrical surface, comprising a body of ferrous metal, magnetic polar ends thereon, undercut grooves in the periphery of said body between said polar ends, and an interlocked connected cast inductor and collector ring system in said grooves.

12. In a homopolar dynamo, a magnetic circuit, a smooth surface cylindrical rotor constituting a part of said magnetic circuit, said rotor having magnetic polar ends, and an inter-connected cast unitary inductor and collector ring system constituting a part of the surface of said rotor between said polar ends.

FRANK L. SESSIONS.